United States Patent [19]
Toyohama et al.

[11] 3,750,786
[45] Aug. 7, 1973

[54] DEVICE AND METHOD FOR STOPPING A POWER DRIVEN UNIT AT A PREDETERMINED POSITION

[75] Inventors: Yukio Toyohama, Kawasaki-shi; Kiyoshi Kobari, Ota-ku, Tokyo, both of Japan

[73] Assignee: Fuji Denki Srizo Kabushiki Kaisha, Kanagawa-ken, Japan

[22] Filed: Dec. 3, 1971

[21] Appl. No.: 204,557

[30] Foreign Application Priority Data
Dec. 11, 1970 Japan.............................. 45/110730

[52] U.S. Cl............... 192/146, 192/4 R, 192/17 C, 192/18 B, 74/781 R
[51] Int. Cl....................... F16d 71/04, D05b 69/26
[58] Field of Search ................ 192/4 R, 17 C, 18 B, 192/146; 74/78 R

[56] References Cited
UNITED STATES PATENTS
3,590,969   7/1971   Kajitani et al. ..................... 192/146
3,636,902   1/1972   Matsubara et al. .............. 112/219 A
3,647,039   3/1972   Oke .................................... 192/146

Primary Examiner—Allan D. Hermann
Attorney—Holman & Stern

[57] ABSTRACT

There is disclosed in connection with a device adapted to stop a driven unit at a predetermined position, said device comprising a driving clutch plate attached to rotor shaft of a motor, a driven clutch plate capable of being engaged with or separated from said driving clutch plate, at least one planetary gear, an intermediate disk, a reduction gear mechanism, and a brake mechanism adapted to cause braking of said driven clutch plate and intermediate disk. Furthermore a method adapted to cause effective operation of the above-mentioned device has been disclosed.

4 Claims, 9 Drawing Figures

DEVICE AND METHOD FOR STOPPING A POWER DRIVEN UNIT AT A PREDETERMINED POSITION

BACKGROUND OF THE INVENTION

This invention relates to a device for stopping sewing machines or other units provided with clutch motors at their predetermined positions, and the method adapted to said device.

Generally, in sewing machine drive devices it is necessary to reduce the speed of the needle driving shaft from the rated value of several thousand rpm to a low speed of several hundred rpm and then to stop the shaft by means of a signal from a synchronous detector so that the stop position of the machine needle can be surely decided at its required point. A clutch motor with a large flywheel is used for driving the sewing machine and generally, since the sewing machine driving should be a low speed operation, either a low speed shaft rotated from the motor shaft via a reduction gear, or a combination of a separate motor and a reduction gear is used. A disk is attached to the above-mentioned low speed shaft and when the foot pedal is released, a driven clutch plate operated by the clutch motor is made to come into contact with said disk. When this happens, the rotational energy of the driven clutch plate is absorbed as heat of friction and then the driven clutch plate is rotated together with the low speed disk. An electromagnetic brake or plunger is excited by means of a signal produced by a position detector synchronized with up/down movements of the sewing machine needle, whereby the driven clutch plate is braked and the driven clutch plate and the low speed disk are separated by means of a direct or indirect shift mechanism. Since in the stopping method mentioned above, the driven clutch plate is braked in the low speed driven condition, reliable control of the machine needle stopping position is secured and mechanically reasonable stopping is also attained.

However, when the above-mentioned machanisms and stopping operation are used, the low speed disk acts as a brake during the conversion from high speed to low speed operation. Therefore, a large brake torque occurs around the mechanical system of the low speed shaft and, so that it is necessary to considerably increase the mechanical strength of the system.

Furthermore, since there is also an impact breaking torque applied to the mechanism, rapid wear of the system presents a problem.

SUMMARY OF THE INVENTION

Therefore, it is an essential object of the invention to avoid such problems caused by the impact braking torque as mentioned above by using a planetary gear mechanism adapted to cause low speed operation of the sewing machine drive device, and by braking the driven clutch plate during conversion from a high speed to a low speed operation by means of a brake attached to a stationary part. It is another object of this invention to provide a rotational direction detector and a brake mechanism which cause smooth connection of the driven clutch plate with a low speed rotational part when speed of the driven clutch plate is decreased from a high speed to a low speed.

The above and other objects of the invention have been attained by the device adapted to stop a driven unit at a predetermined position, which comprises, in combination a motor, a driving clutch plate attached to a rotor shaft of said motor, a driven clutch plate which is connected to said driven unit and can be engaged with or separated from said driving clutch plate, at least one planetary gear supported by said driven clutch plate, an intermediate disk which rotates coaxially with said rotor shaft via a gear meshed with said planetary gear, a reduction gear mechanism arranged between the planetary gear and end part of said rotor shaft, and a brake mechanism adapted to cause alternate braking of said driven clutch plate and intermediate disk.

Control of the device mentioned above has been effectively attained by the improved method, comprising steps of separating the driven clutch plate from the driving clutch plate; braking the driven clutch plate by the brake mechanism thereby to reduce its speed; braking and stopping the intermediate disk by the brake mechanism on the basis of a first signal produced upon changeover of the rotational direction of the intermediate disk; and braking and stopping the driven clutch plate by the brake mechanism on the basis of the logical product of the first signal and a second signal produced in accorcance with a predetermined position of the driven unit.

The foregoing objects as well as the characteristic features and function of the invention will become apparent and more readily understandable by the following description when read in connection with the accompanying drawings, in which the same and equivalent members are designated by the same numerals and characters.

DETAILED DESCRIPTION OF THE INVENTION

Figure 1:
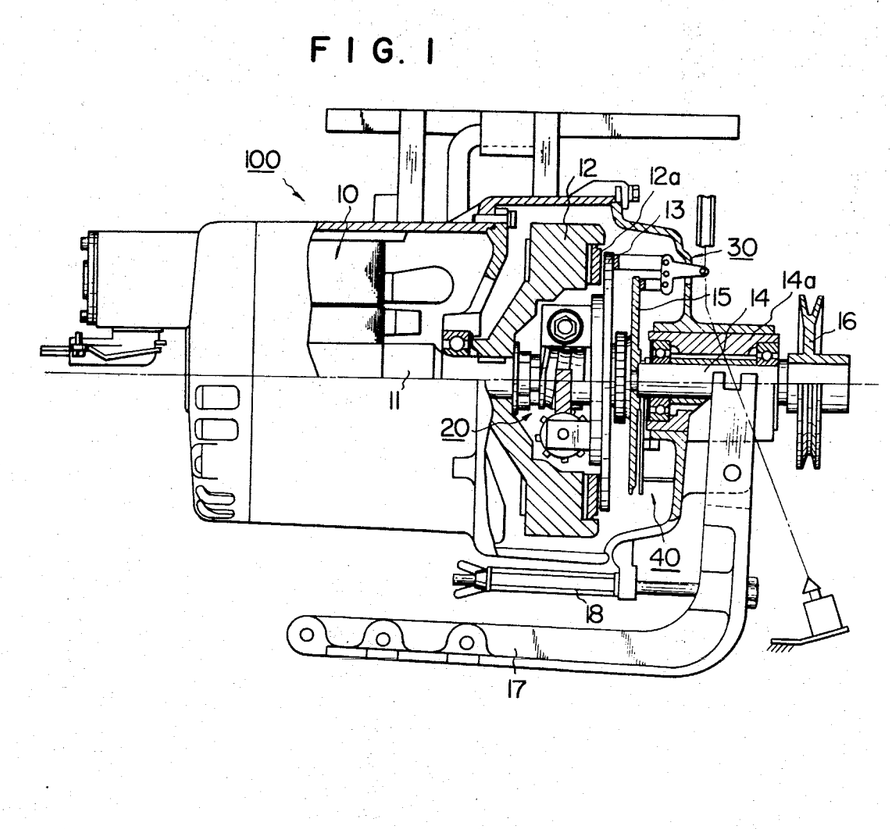
FIG. 1 is a cross-sectional view of main part of a clutch motor according to this invention.

Referring to FIGS. particularly to FIG. 1, a sewing machine drive device 100 of this invention comprises an electric motor 10, provided with its rotor shaft 11, a driving clutch plate flywheel 12 attached to one end of the shaft 11, a driven clutch plate 13, a pulley shaft 14 which supports said clutch plate 13 on one end, a bearing sleeve 14a which makes possible free rotation of said shaft 14 and is supported slidably in the axial direction, an intermediate disk 15 capable of rotating around the pulley shaft 14, a pulley 16 attached to the other end of the pulley shaft 14, a forked lever 17 which is used for engaging or separating the clutch plates 12 and 13 with or from each other by sliding the bearing sleeve 14a in the axial direction, a spring 18 adapted to restore said lever 17 to its separated position, a gearing 20 which connects the end of the rotor shaft 11 with the intermediate disk 15, a brake mechanism 30 for causing alternate braking of the driven clutch plate 13 and the intermediate disk 15, and a rotational direction detector 40. A part 12a is the clutch lining attached to the driving clutch plate 12.

Figure 2:
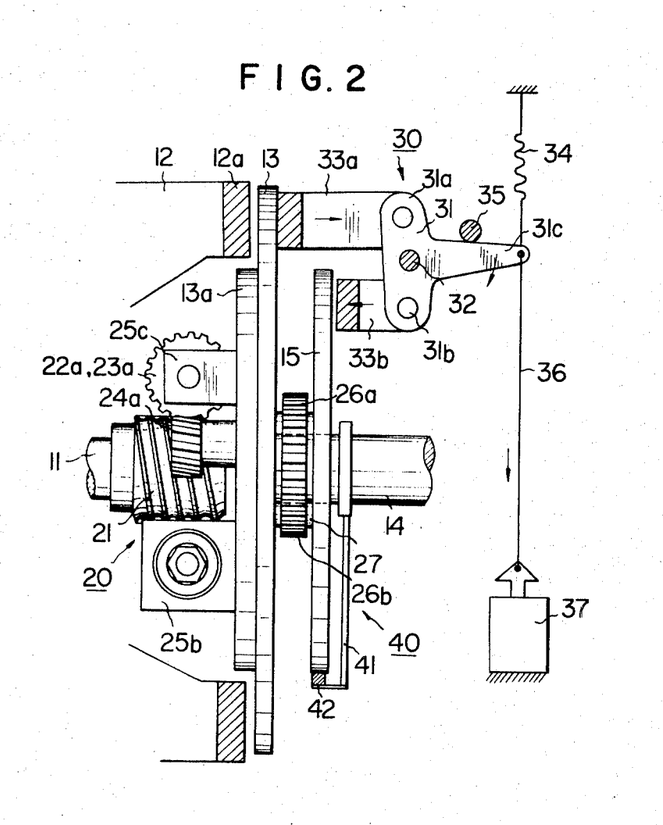
FIG. 2 is a side view of a gear control mechanism used in this invention.
Figure 3A:
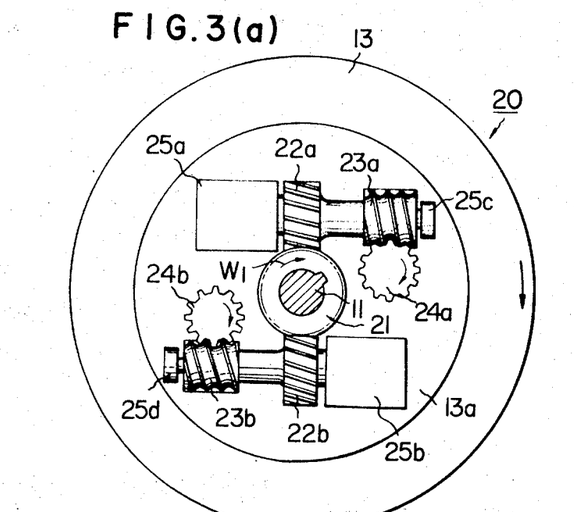
FIGS. 3(a) and 3(b) show the same mechanism as in FIG. 2, the former being viewed from left side and the latter being viewed from right side.

The gearing 20, the brake mechanism 30 and the rotational direction detector 40 will be explained in detail in connection with FIG. 2 to FIG. 5. In FIGS. 2 and 3(a), a worm 21 is attached to the end of the rotor shaft 11 and this worm is meshed with pinions 22a and 22b. These pinions are attached, by means of bearings 25a and 25b, to a support plate 13a which forms a single unit with the driven clutch plate 13. Therefore, the speed of the pinions 22a and 22b is proportional to the relative speed between the rotor shaft 11 and the driven clutch plate 13, and the speed reduction ratio is also proportional to the number of pinion gears. Worms 23a and 23b united respectively with the pinions 22a and 22b are provided, said worms being meshed respectively with pinions 24a and 24b which in turn are attached to shafts passing through the support plate 13a and the driven clutch plate 13. Hence, the worms 23a and 23b and pinions 24a and 24b reduce rotational speed of the gear mechanism.

Figure 3B:
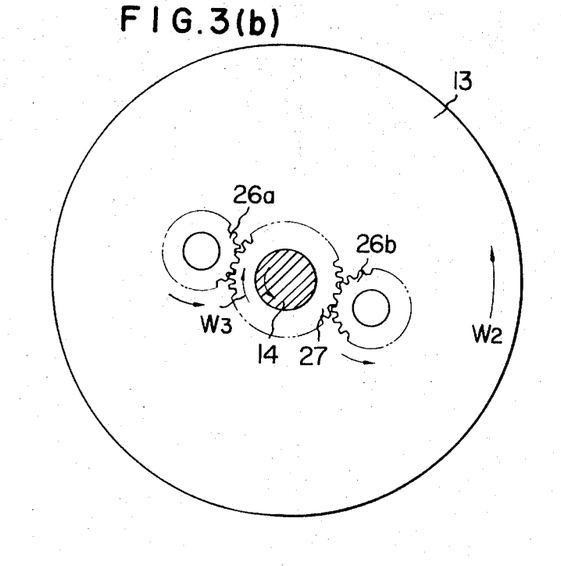

Rotation of the pinions 24a and 24b is taken up by planetary gears 26a and 26b which are attached to the opposite side of the driven clutch plate 13 as can be seen in FIG. 3(b), said planetary gears 26a and 26b both being meshed in common with a sun gear 27 which can turn freely around the pulley shaft 14.

When the relative speed between the rotor shaft 11 and the driven clutch plate 13 is zero, i.e., when both are rotating together at the same speed, the worm 21 does not rotate with respect to the pinions 22a and 22b, so that the pinions 22a and 22b, worms 23a and 23b, pinions 24a and 24b and planetary gears 26a and 26b do not rotate and therefore the sun gear 27 also does not rotate with respect to the planetary gears 26a and 26b, whereby the sun gear 27 is rotated as a single unit with the driven clutch plate 13.

Occurrence of a relative speed between the rotor shaft 11 and the driven clutch plate 13 corresponds generally to a case wherein the speed of the rotor shaft 11 is constant and that of the driven clutch shaft 13 is reduced. Under such condition, if let it be assumed that the driven clutch plate 13 rotates in the direction shown by the arrow $\omega_2$ in FIG. 3(b), the planetary gears 26a and 26b start to rotate in the arrow direction and therefore the sum gear 27 rotates in the rotational direction $\omega_3$ opposite to that of the driven clutch plate 13. As a result, the speed of the sun gear 27 is reduced by a greater percentage than the speed of the driven clutch plate 13.

Intermediate disk 15 is attached to the sun gear 27 to form a single unit. The action of the afore-mentioned gearing 20 can be summarized as follows. That is, the driven clutch plate 13 and the intermediate disk 15 are connected by a differential gear mechanism which is made up of the planetary gears 26a and 26b and the sun gear 27. The shafts of planetary gears 26a and 26b and the motor rotor shaft 11 are connected by a reduction gear mechanism consisting of two stages of worms and pinions.

As shown in FIG. 2, the brake mechanism 30 adapted to carry out alternate braking of the driven clutch plate 13 and the intermediate disk 15 consists of a link lever 31, a shaft 32 which rotatably supports said lever at its middle part, brake shoes 33a and 33b which are respectively supported at the ends 31a and 31b of the lever 31 by means of respective pins, a return spring 34 which urges an operating end 31c of the lever 31 to the upward direction, a stop pin 35 which limits rotation of the lever 31, and an electromagnetic plunger 37 which pulls the operating end 31c via a rope 36 against the tension of the return spring 34.

Figure 4:
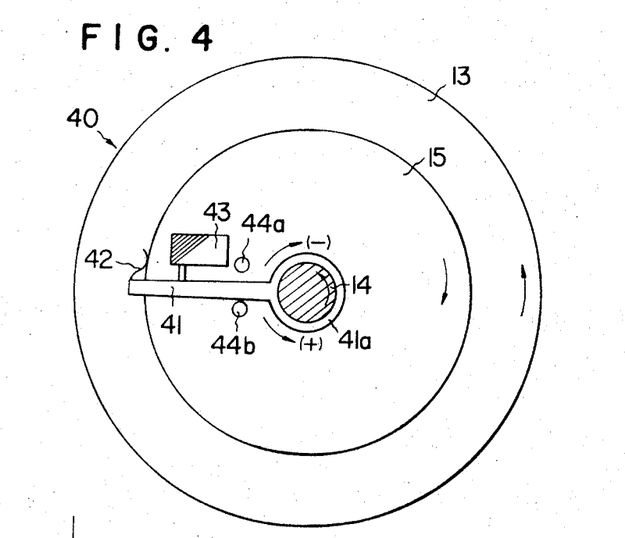
FIG. 4 shows detailed structure of a rotational direction detector used for the gear change command.

A rotational direction detector 40 such as shown in FIG. 4 is provided to obtain operating commands for the electromagnetic plunger 37. This detector comprises a detector lever 41 having a hub 41a which is rotatably fitted around the pulley shaft 14, a plate spring 42 which is in frictional contact with the outer circumference of the intermediate disk 15 and is connected to the front end part of the lever 41, a microswitch 43 which is operated by means of the lever 41 and is attached to a stationary frame not shown, and stop pins 44a and 44b adapted to limit turning angle of the detector lever 41 attached to the stationary frame.

Figure 5:
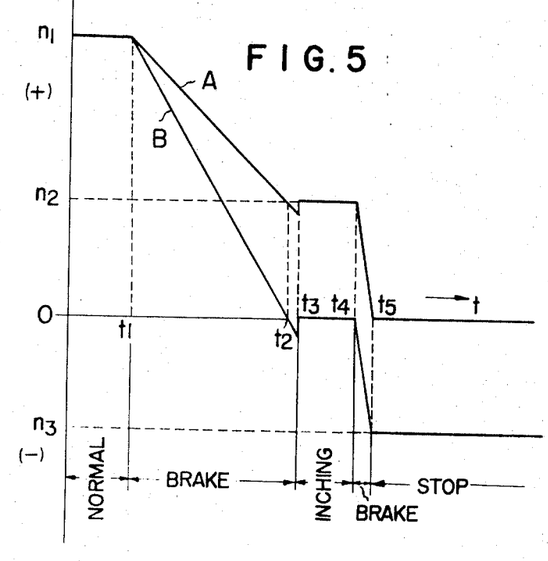
FIG. 5 shows a graph showing relation between speed and time and indicating relation between microswitch operation and rotational direction of an intermediate disk in the device according to this invention.

Operation of the drive device of this invention will be explained in connection with speed-time characteristic graphs shown in FIG. 5. Let it be assumed that the machine is normally driven for a period of time $t_1$. Namely, as the foot pedal is pressed, the lever 17 shown in FIG. 1 is pulled down-wards, so that the driven clutch plate 13 is engaged with the driving clutch plate 12 which also serves as the flywheel which is rotated at the rated speed $n_1$. The pulley shaft 14 and the pulley 16 which form a single unit with the driven clutch plate 13 are also rotated at the rated speed $n_1$. When the foot pedal is released in order to stop the machine at the time $t_1$, the lever 17 is returned to the release position by the spring 18 and the driven clutch plate 13 is separated from the driving clutch plate 12. As can be seen in FIG. 2, it makes the driven clutch plate 13 contact with the upper brake shoe 33a of the link lever 31 which is urged upward by the return spring 34. In this way, the driven clutch plate 13 decelerates and simultaneously, the speed of the intermediate disk 15 is reduced in a greater degree that that of the plate 13.

When the angular velocities of the motor rotor shaft 11, the driven clutch plate 13 and the intermediate disk 15, designated by $\omega_1$, $\omega_2$ and $\omega_3$ respectively, are in the arrow directions shown in FIG. 3(a) and (b), then each speed is assumed to be positive. In this case, if numbers of gear teeth in the pinions 22a and 22b, the pinions 24a and 24b, the planetary gears 26a and 26b and the sun gear 27 are taken as $N_1, N_2, N_3$ and $N_4$ respectively, then the following relation is obtained;

$$\omega_3 = (N_3/N_1 \cdot N_2 \cdot N_4) \omega_1 - (1 + N_3/N_1 \cdot N_2 \cdot N_4) \omega_2 \quad (1)$$

Therefore, the angular velocities $\omega_3$ of the sun gear 27, i.e., of the intermediate disk 15 is decreased. The angular speed $\omega_2$ of the rotor shaft is constant and during a period of time from $t_o$ to $t_1$, a relation ($\omega_1 = \omega_2$) is established.
Therefore:

$$\omega_3 = -\omega_2 \quad (2)$$

Since the arrow directions in FIG. 3(b) are positive, the rotation directions of the intermediate disk 15 and the sun gear 27 are opposite to said arrow directions, i.e., they are rotating in the same direction as the driven clutch plate 13 and it is also evident from the equation (2) that their speeds are the same. The course of the afore-mentioned speed reduction is shown by curve A for the driven clutch plate 13 and by curve B for the intermediate disk 15. At the time $t_2$, the speed of the intermediate disk 15 becomes zero and the speed of driven clutch plate 13 becomes a low speed $n_2$ which is determined from the equation (1). On the other hand, the upper brake shoe 33a is in a state of applying an effect on the driven clutch plate 13, so that its speed is further reduced from the value $n_2$. At this time, the intermediate disk 15 begins to rotate in the reverse direction to the direction in which it had been rotating, whereby, the lever 41 is turned clockwise as viewed in FIG. 4 and the microswitch 43 closes the contacts. Therefore, the electromagnetic plunger 37 is excited and the link lever 31c is turned clockwise as viewed in FIG. 2, whereby the upper brake shoe 33a is separated from the driven clutch plate 13 and the lower brake shoe 33b makes contact with the intermediate disk 15. At this time, the intermediate disk 15 has already started to turn in the reverse direction, but since its speed is almost zero, the intermediate disk 15 is stopped smoothly. This time is shown by $t_3$ in FIG. 5 and since this time, the driven clutch plate 13 and the pulley shaft 14 are rotated at a speed $n_2$. Excitation of the electromagnetic plunger 37 is again stopped at the time $t_4$ by a signal from any synchronous detector not shown, whereby the driven clutch plate 13 is braked by the upper brake shoe 33a and then stopped. This braking time corresponds to ($t_4 - t_5$) shown in FIG. 5.

Since the speed $n_2$ is very low, for example it is about one-thirtieth of the rated speed $n_1$, stopping can be performed at the correct position. Then, the driven clutch plate 13 is stopped and the intermediate disk 15 rotates in the reverse direction at the speed determined according to the equation (1).

Figure 6A:
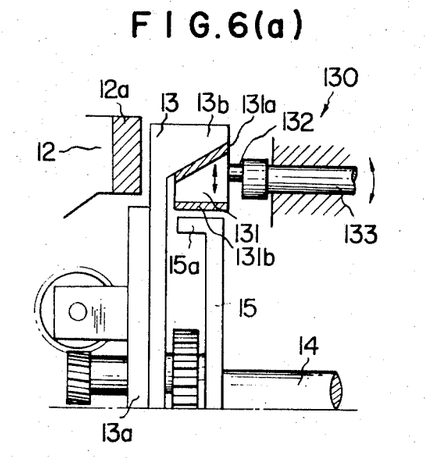
FIGS. 6(a) and 6(b) show a side view of an actual example of the brake mechanism according to the invention and a front view of the brake of said brake mechanism, respectively.
Figure 6B:
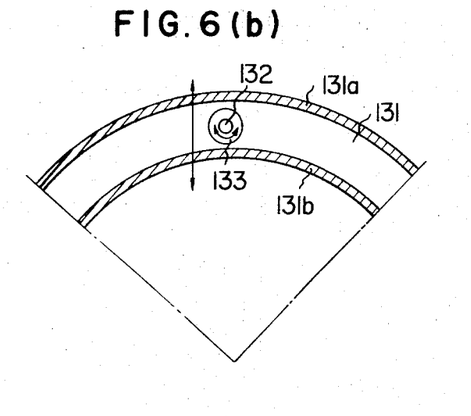

FIG. 6 shows another embodiment 130 of the brake mechanism. This mechanism comprises a sector-form brake shoe 131, drum parts 13b and 15a which are provided to the driven clutch plate 13 and the intermediate disk 15 respectively, and an eccentric shaft mechanism made up of an eccentric pin 132 and an operating shaft 133. The operating shaft 133 can be turned by a combination of the return spring and electromagnetic plunger as shown in FIG. 2. The brake shoe 131, as clear in FIG. 6, has a tapered outer surface and the inner surface of the drum part 13b is conically formed so as to be matched with the tapered surface of the brake shoe 131. This makes it easy to release the driven clutch plate from braking condition. The brake shoe 131 is provided with clutch linings 131a and 131b attached thereto.

Since the shaft of the eccentric pin 132 is eccentric with respect to the operating shaft 133, the brake shoe 131 can be moved up and down by rotating the operating shaft 133 and in this way, either the driven clutch plate 13 or the intermediate disk 15 can be selectively braked. It is necessary for the connection between the brake shoe 131 and the eccentric pin 132 to allow freedom of rotatable movement, and furthermore it is preferable to provide a suitable guide device or too connected groups of the eccentric shaft mechanisms of the sides of the brake shoe in order to keeps the brake shoe 131 parallel to peripheral surfaces of the drum parts 13b and 15a when the shoe is moving. When the brake shoe is supported by the eccentric shaft mechanism, strong and uniform surface pressure braking effect is exercised by combination of self excitation of the brake and friction torque of the eccentric shaft.

Figure 7:
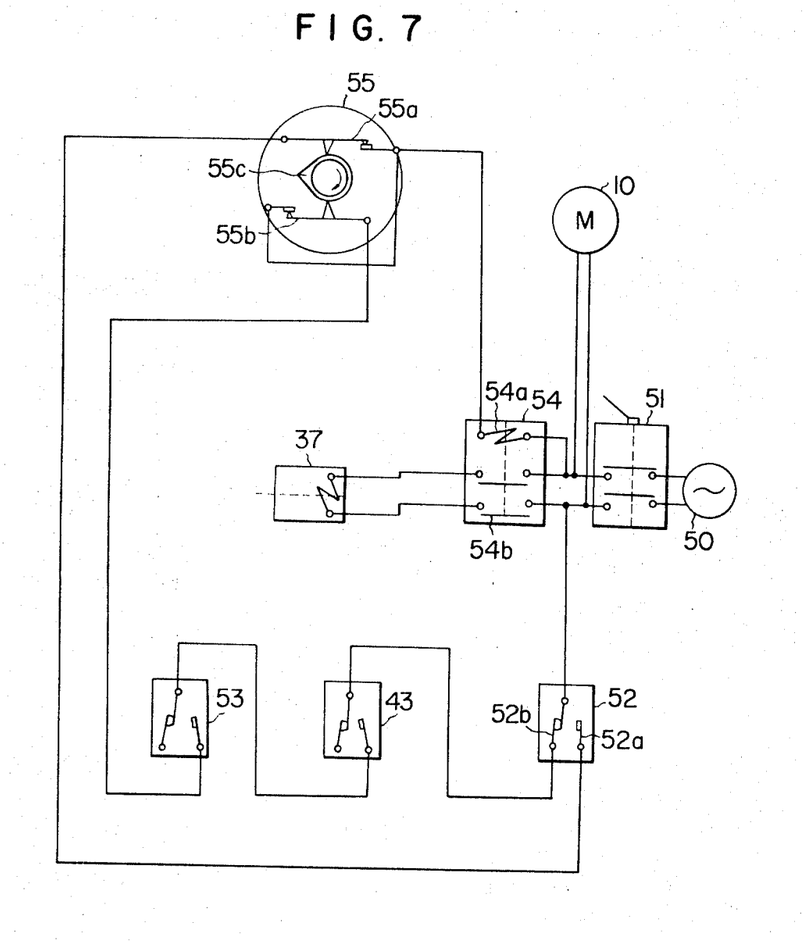
FIG. 7 shows wiring used in the sewing machine drive device of this invention.

FIG. 7 shows connection diagram for the drive device of this invention, in which the motor 10 is connected to a.c. power source 50 via a power source switch 51.

There are provided a switch 52 for selecting up and down stopping position of the needle, a foot pedal switch 53, a relay 54 for exciting the electromagnetic plunger 37, and the synchronous detector 55, and a microswitch 43 for the afore-mentioned rotational direction detector.

The relay 54 comprises an operating coil 54a and a contact pair 54b and the synchronous detector 55 comprises a pair of contacts 55a and 55b and a cam 55c. Contact pair 54b is closed by the excitation of the operating coil 54b, whereby the electromagnetic plunger 37 is attracted. This operating coil 54a is connected at one end to one terminal of the power source and at another end to the other terminal of the power source via the upper contact 55a of the synchronous detector 55 and the contact 52a of the selection switch 52 or via the lower contact 55b of the synchronous detector 55, the foot pedal switch 53, the rotational direction detector microswitch 43 and the contact 52b of the selection switch 52.

The upper contact 55a of the synchronous detector 55 is opened when the machine needle is in the upper position and the lower contact 55b is opened when the machine needle is in the lower position.

As described previously, the microswitch 43 opens the circuit, because the intermediate disk is rotating counterclockwise in FIG. 4 when the driven clutch plate is rotating at a high speed. On the contrary, when the driven clutch plate is rotating at a speed less than the value $n_2$, the intermediate disk is rotated in the reverse direction, so that the switch 43 closes. Consequently, the microswitch 43 is also closed when the driven clutch plate is stopped. The foot pedal switch 53 is constructed so that it is closed when the foot is released or opened when the foot is applied to the pedal.

A major part of the work of this type of sewing machine drive device is the operation for stopping the machine needle in the lower position and therefore the selection switch 52 closes the contact 52b. When the machine needle is at rest, the contact 55b of the synchronous detector 55 is opened by the cam 55c, so that the coil 54 is not excited even though the switches 43 and 53 which are connected in series with said contact 55b are in the operating condition. Since the electromagnetic plunger 37 is not operated in this condition, the brake mechanism brakes and keeps the driven clutch plate at rest. The driven clutch plate 13 is separated from the brake mechanism by pushing the foot pedal for machine shaft drive and is engaged with the driving clutch plate 12, whereby the driven clutch plate 12 is quickly put in high speed operation. Simultaneously, the foot pedal switch 53 is opened and the microswitch 43 is also opened. When the foot pedal is released with the contact 52b of the selection swtich 52 in the closed condition, the switch 53 is closed and the driven clutch plate is first braked by the brake mechanism. When its speed is less than the required value, the microswitch 43 of the rotational direction detector is also closed. If the contact 55b of the synchronous detector 55 is closed at this time, the operating coil 54a of the relay 54 is excited, the electromagnetic plunger 37 is attracted and the intermediate disk is braked thereby to cause surely a low speed operation of the driven clutch plate. Next, when the contact 55b is opened by the cam 55c, the electromagnetic plunger 37 is again deenergized and the driven clutch plate is braked and stopped by the brake mechanism. In other words, when the needle is in the lower position, the machine shaft is stopped. If the contact 55b of the synchronous detector 55 is open at the time when the microswitch 43 is closed, the driven clutch plate braking continues and the machine shaft is always at rest under the condition such that the needle is in the lower position. Under such condition, if the selection switch 52 is changed over and the contact 52a is closed, because of closed state of the contact 55a of the synchronous detector 55, the operating coil 54 is again excited and the electromagnetic plunger 37 is attracted, whereby the intermediate disk being rotated in the reverse direction is braked and stopped. Consequently, the driven clutch plate is operated at a low speed and subsequently when contact 55a is opened by cam 55c, the operation coil 54 is again deenergized thereby to cause stopping of the driven clutch plate by the brake mechanism. In this case, the machine needle is in the uuper position, and the material can be removed off from the machine.

Next, since the contact 55b and the switches 43 and 53 are all maintained in the closed state, if the selection switch 52 is changed over so as to close the contact 52b, excitation of the operating coil 54 and attraction of the electromagnetic plunger 37 are caused again, so that the machine needle is stopped in the lower position after the machine shaft is rotating at a low speed. This operation can be performed after insertion of a new piece of material. After this step, the same operation as described before is repeated.

In the drive device of this invention, in the case when the driving is to be converted from a high speed operation to a low speed operation, braking and speed reduction are carried out by a brake mechanism provided on the stationary part and at this time the reduction gear system is in idle running without transmitting any torque, so that there is no mechanical wear due to a large braking torque. Also since during the speed reduction process of the driven clutch plate the speed is detected in response to changes in the rotational direction of the intermediate disk by means of a planetary gear mechanism, the speed detection is preformed singly and reliably.

In the embodiments mentioned above, a sewing machine is mentioned as a load of the drive device for stopping a driven unit at a predetermined position stopping, but if, for example, the foot pedal, foot pedal switch and synchronous detector are replaced by suitable equivalent operating mechanisms and switch systems, it is possible to use the device for position control in industrial machinery, etc. Furthermore, the mechanical contacts shown in FIG. 7 can also be converted to some other suitable contactless elements.

We claim:

1. A device adapted to stop a driven unit at a predetermined position, which comprises, in combination, a motor, a driving clutch plate attached to a rotor shaft of said motor, a driven clutch plate which is connected to said driven unit and can be engaged with or separated from said driving clutch plate, at least one planetary gear supported by said driven clutch plate, an intermediate disk which rotates coaxially with said rotor shaft via a gear meshed with said planetary gear, a reduction gear mechanism arranged between the planetary gear and end part of said rotor shaft, and a brake mechanism adapted to cause alternate braking of said driven clutch plate and intermediate disk.

2. A device according to claim 1, having a rotational direction detector which comprises a detector lever firctionally contacted with the intermediate disk and a microswitch operated by said lever thereby to detect the rotational direction of the intermediate disk.

3. A device according to claim 1, in which the brake mechanism comprises a sector-form brake shoe, drum parts provided respectively on the driven clutch plate and intermediate disk so as to be opposite respectively to the outer and inner surfaces of the brake shoe, and an eccentric shaft mechanism connected to the brake shoe.

4. A method of controlling a device adapted to stop a driven unit at a predetermined position and comprising a driving clutch, a driven clutch plate driven by said driving clutch, a brake mechanism adapted to reduce the speed of said driven clutch plate, an intermediate disk interposed between said driving and driven clutch plates; which comprises successive steps of separating the driven clutch plate from the driving clutch plate, braking the driven clutch plate by the brake mechanism to reduce its speed, braking and stopping the intermediate disk by the brake mechanism when a rotational direction of the intermediate disk changes over, and then braking and stopping the driven clutch plate by the brake mechanism when the driven unit reaches a predetermined position.

* * * * *